United States Patent [19]
Kon

[11] Patent Number: 5,636,516
[45] Date of Patent: Jun. 10, 1997

[54] SWING HYDRAULIC CIRCUIT IN CONSTRUCTION MACHINE

[75] Inventor: Masaharu Kon, Komatsu, Japan

[73] Assignee: Komatsu Ltd., Tokyo, Japan

[21] Appl. No.: 448,414

[22] PCT Filed: Dec. 2, 1993

[86] PCT No.: PCT/JP93/01758

§ 371 Date: Jun. 2, 1995

§ 102(e) Date: Jun. 2, 1995

[87] PCT Pub. No.: WO94/12737

PCT Pub. Date: Jun. 9, 1994

[30] Foreign Application Priority Data

Dec. 2, 1992 [JP] Japan ..................... 4-345111

[51] Int. Cl.$^6$ ..................... F16D 31/02
[52] U.S. Cl. ..................... 60/466; 60/468
[58] Field of Search ..................... 60/466, 468

[56] References Cited

U.S. PATENT DOCUMENTS

| | | | |
|---|---|---|---|
| 5,062,266 | 11/1991 | Yoshimatsu | 60/466 |
| 5,159,813 | 11/1992 | Yoshimatsu et al. | 60/466 X |
| 5,272,877 | 12/1993 | Fukushima et al. | 60/466 X |
| 5,285,643 | 2/1994 | Hirata et al. | 60/468 |

FOREIGN PATENT DOCUMENTS

| | | |
|---|---|---|
| 57-33026 | 7/1982 | Japan . |
| 61-165432 | 7/1986 | Japan . |
| 3-41203 | 4/1991 | Japan . |
| 4-244669 | 9/1992 | Japan . |
| 5-27303 | 4/1993 | Japan . |

*Primary Examiner*—Hoang Nguyen
*Attorney, Agent, or Firm*—Sidley & Austin

[57] ABSTRACT

The present invention provides a swing hydraulic circuit for use in a construction machine, which is free from a shock upon the starting and stopping of the turning frame even though the reach of the working machine is small and from a delay upon the starting and stopping of the turning frame even though the reach of the working machine is large. The swing hydraulic circuit includes a remote control turning valve (30) for controlling, by operation of a lever, a pilot pressure to a secondary side; a directional control valve (4) to be changed over with a pilot pressure from the remote control turning valve (30) to two pilot flow conduits; a hydraulic motor (5) for turning to which a flow rate of oil from an oil reservoir (1) is controlled by said directional control valve (4), and relief valves (11a, 11b) which are provided for the two flow conduits (6a, 6b) of the hydraulic motor for turning; a set pressure control means capable of varying the set pressures of both relief valves in accordance with an attitude of the working machine of the construction machine.

20 Claims, 5 Drawing Sheets

EXAMPLE IN CLOCKWISE TURNING

| | LEFT-SIDE RELIEF VALVE 11a ←→ REACH MAX. | RIGHT-SIDE RELIEF VALVE 11b ←→ REACH MIN.      REACH MAX. | PRESSURE SWITCH 34b | PRESSURE SWITCH 34a |
|---|---|---|---|---|
| (1) IN CASE OF STATIONARY STATE | PRESET PRESSURE ↑ CANCEL | CANCEL ↑ 270 kg/cm2 | COUNTER-CLOCKWISE TURN OFF | CLOCKWISE TURN OFF |
| (2) IN CASE OF STARTING CLOCKWISE TURN | PRESET PRESSURE ↑ ACCELERATION SIDE OPERATION | DECELERATION SIDE CANCEL ↑ 270 kg/cm2  100kg/cm2 | COUNTER-CLOCKWISE TURN OFF | CLOCKWISE TURN ON |
| (3) IN CASE OF REGULAR TURN | PRESET PRESSURE ↑ ACCELERATION SIDE CANCEL  50kg/cm2 | DECELERATION SIDE OPERATION ↑ 270 kg/cm2 | COUNTER-CLOCKWISE TURN OFF | CLOCKWISE TURN ON |
| (4) IN CASE OF STOPPING | PRESET PRESSURE ↑ ACCELERATION SIDE CANCEL  50kg/cm2 | DECELERATION SIDE OPERATION ↑ 270 kg/cm2 | COUNTER-CLOCKWISE TURN OFF | CLOCKWISE TURN ON |
| (5) IN CASE OF STOPPING | PRESET PRESSURE ↑ ACCELERATION SIDE OPERATION  50kg/cm2 | DECELERATION SIDE OPERATION ↑ 270 kg/cm2 | COUNTER-CLOCKWISE TURN OFF | CLOCKWISE TURN OFF |

FIG. 3

SWING HYDRAULIC CIRCUIT IN CONSTRUCTION MACHINE

FIELD OF THE INVENTION

The present invention relates to improvement of a swing hydraulic circuit for use in construction machines, such as hydraulic shovels and hydraulic cranes.

RELATED BACKGROUND ART

A swing hydraulic circuit for use in a hydraulic power shovel which has generally been used is shown in FIG. 5. A discharging flow conduit 102 of a main hydraulic pump 101 is connected to a main relief valve 103 and through a pilot directional control valve (hereafter referred to as "directional control valve") 104, which is switchable as required, to the side flow conduits 106a and 106b of a hydraulic motor 105 for turning a turning frame 121 which mounts a working machine boom 120, and a return oil conduit 108 leading to a tank 107. The side flow conduits 106a and 106b are switchably connected, as required, through the directional control valve 104 to a return oil conduit 109 leading to the tank 107.

A remote control turning valve 130 is provided with a pair of variable reducing valves 131a and 131b and an operation lever 132. A pilot hydraulic pump 140 is connected to the primary side of each of the variable reducing valves 131a and 131b, and the flow conduits 133a and 133b are connected to respective secondary sides thereof. The pilot flow conduits 133a and 133b are connected, respectively, to the pilot ports 104a and 104b, located at opposite ends of the directional control valve 104.

A relief valve 111a is provided between the flow conduit 106a and a return oil conduit 110 to the oil reservoir 107, and a relief valve 111b is provided between the flow conduit 106b and the return oil conduit 110 to the oil reservoir 107.

Check valves 112a and 112b, for preventing cavitation, are provided in parallel with relief valves 111a and 111b, respectively.

In a construction as described above, when, for example, the operation lever 132 is operated from a neutral position N to the R direction, a pilot pressure is guided from the variable reducing valve 131a to the pilot flow passage 133a and further guided to the pilot port 104a of the directional control valve 104, so that the directional control valve 104 is changed over from the neutral position N to a position L. A discharging oil of the hydraulic pump 101 flows through the directional control valve 104 into the oil conduit 106a and then into the hydraulic motor 105; at the same time the hydraulic pressure rises up to the set pressure of the relief valve 111a. The discharging oil from the hydraulic motor 105 is returned to the oil reservoir 107 through the flow conduit 106b, the directional control valve 14, and the return oil conduit 109. Thus, the hydraulic motor 105 is driven and accelerated, and the turning frame 121 is turned and accelerated.

When the operation lever 132 is reset to the neutral position N, the pilot pressure which has been guided to the pilot port of the directional control valve 104 is shut off and the directional control valve 104 is reset to the neutral position N. Then, the discharging oil from the hydraulic pump 101 is returned to the oil reservoir 107 through the return oil passage 108 and does not flow into the hydraulic motor 105. However, due to an inertial force of the turning frame 121, the hydraulic motor 105 sucks hydraulic oil from the oil reservoir 107 through the flow passage 106a, the check valve 112a and the return oil passage 110. When the pressure of this hydraulic oil is boosted to a set pressure of the relief valve 111b, the hydraulic oil is returned to the oil reservoir 107 through the flow passage 106b, the relief valve 111b, and the return oil passage 110. In this case, the hydraulic oil is returned to the oil reservoir 107 against the present pressure of the relief valve 111b to act as a resistance to the rotation of the hydraulic motor 105. Therefore, the inertial force of the turning frame 121 is absorbed and the rotation of the hydraulic motor 105 is stopped.

However, when the tilting angle θ of the boom 120 of the working machine installed on the turning frame 121 is small and the reach of the working machine is set at the maximum, the inertial force of the turning frame 121 greatly differs from that when the tilting angle θ is large and the reach of the working machine is set at the minimum. If the set pressure of the relief valve 111b is fixed, the starting torque and the stopping torque (the torque to stop rotation of the hydraulic motor 105 according to the set pressure of the relief valve 111b) of the hydraulic motor 105 are excessively large as compared with the inertial force of the turning frame 121 when the reach of the working machine is at a minimum, and therefore a shock at the time of starting and stopping is large, as shown in FIG. 6A. On the other hand, there is a problem in that, if the set pressure of the relief valve 111b is decreased in accordance with the shorter reach of the working machine 120 in order to reduce the shock, the inertial force of the turning frame 121 is excessively large when the reach of the working machine 120 is at a maximum, and starting and stopping will be delayed, as shown in FIG. 6B.

SUMMARY OF THE INVENTION

An object of the present invention, made to solve the above-described problem, is to provide a swing hydraulic circuit for use in construction machines capable of preventing a shock, upon starting and stopping of a turning frame when the reach of a working machine is short, and a delay of operation, upon starting and stopping of the turning frame when the reach of the working machine is long.

According to the present invention, a swing hydraulic circuit for use in a construction machine comprises:

a remote control turning valve for controlling, by operation of a lever, a pilot pressure to a secondary side;

a directional control valve having two pilot flow conduits connected to the remote control turning valve;

a hydraulic motor for turning to which a flow rate of hydraulic oil from a hydraulic pump is controlled by the directional control valve;

relief valves provided on both side flow conduits of the hydraulic motor for turning; and a set pressure control means for varying the set pressures of both relief valves in accordance with an attitude of a working machine of the construction machine.

This set pressure control means comprises pressure switches provided at the extreme ends of respective branch conduits connected to the remote control turning valve, a controller for receiving signals of the respective pressure switches and a signal in accordance with the attitude of the working machine, and solenoid proportional valves for controlling the set pressures of the relief valves according to a command from the controller.

One end of each of these solenoid proportional valves is connected through a pilot flow conduit to a respective relief valve, and the other end of each of these solenoid proportional valves is connected either to the oil reservoir or to the hydraulic pump.

A construction as described above enables a low set pressure of the relief valves to be set when the tilting angle of the boom of the working machine is large and the reach of the working machine is small; and therefore no shock will be caused when starting and stopping the turning frame. When the tilting angle of the boom of the working machine is small and the reach of the working machine is large, the set pressure of the relief valves can be high and therefore no delay of operation will be caused when starting and stopping the turning frame.

BRIEF DESCRIPTION OF THE DRAWINGS

FIG. 3 is a diagram showing a relationship between the reach of the working machine in clockwise rotation and the set pressure of the relief valves;

BEST MODE FOR CARRYING OUT THE INVENTION

A first embodiment of a swing hydraulic circuit for use in a construction machine according to the present invention is described in detail below, referring to FIGS. 1 to 3.

Figure 1:
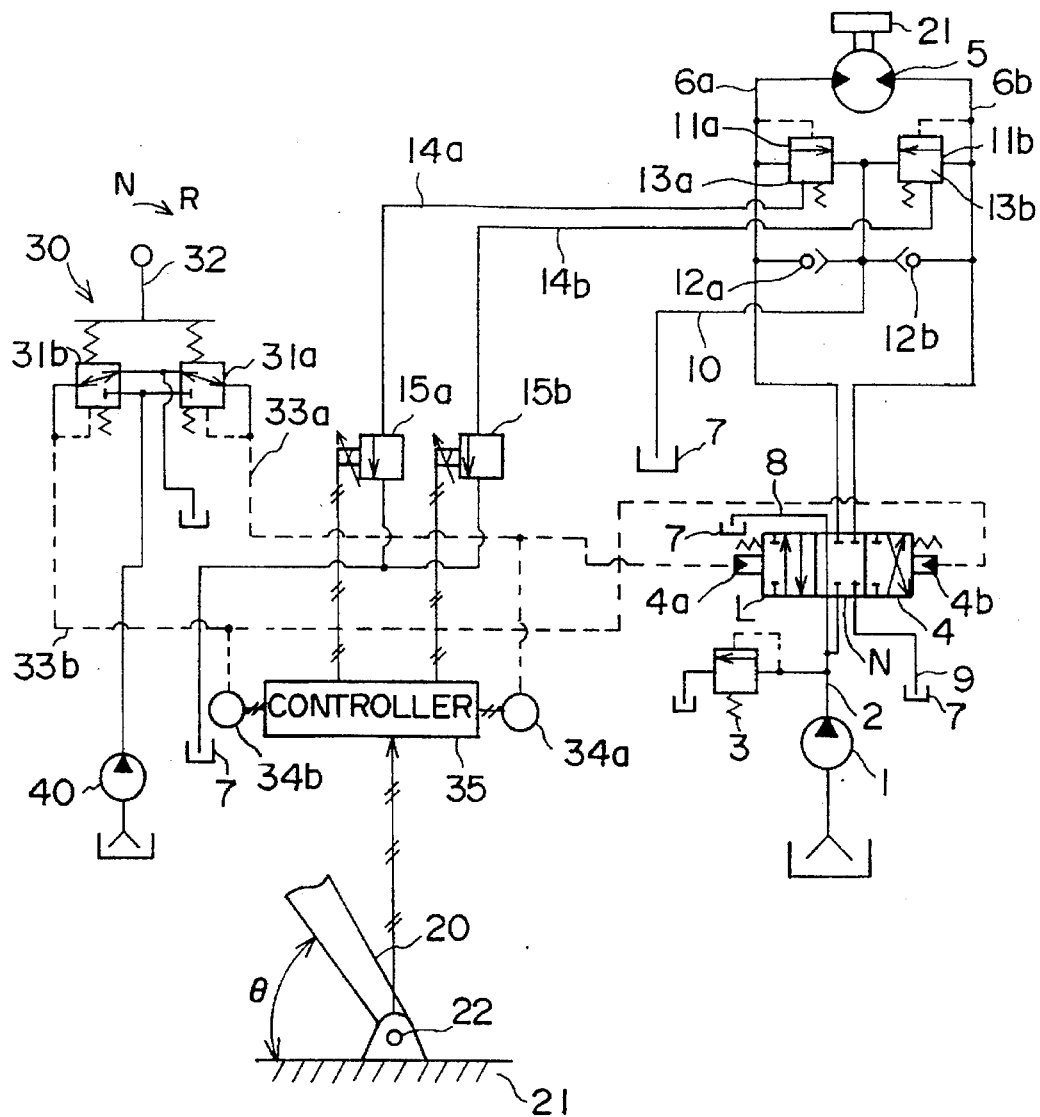
FIG. 1 is a diagram of a swing hydraulic circuit for a hydraulic shovel according to a first embodiment of the present invention.
Figure 2:
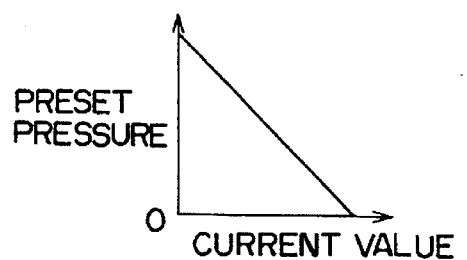
FIG. 2 is a diagram showing a relationship between the current value and the set pressure.

A discharging flow conduit 2 of a main hydraulic pump 1 is connected to a main relief valve 3 and through a directional control valve 4, which is switchable as required, to the side flow conduits 6a and 6b of a hydraulic motor 5 for turning a turning frame 21 which mounts a working machine boom 20, and a return oil conduit 8 leading to an oil reservoir 7, as shown in FIG. 1. The side flow conduits 6a and 6b are switchable connected, as required, to a return oil conduit 8 leading to the oil reservoir 7.

A remote control turning valve 30 has a pair of variable reducing valves 31a and 31b and an operation lever 32 for these valves. A pilot hydraulic pump 40 is connected to the primary side of both variable reducing valves 31a and 31b, while the pilot flow conduits 33a and 33b are connected to the respective secondary sides thereof. The pilot flow conduits 33a and 33b are connected, respectively to pilot ports 4a and 4b, provided at opposite ends of the directional control valve 4. The pressure switches 34a and 34b are provided at extreme ends of the respective branch circuits, and the signals of the pressure switches 34a and 34b are transmitted to the controller 35.

A potentiometer 22 is attached to the rotation pivot of the boom 20. Accordingly, a tilting angle θ of the boom 20 is measured, and a measured value of that angle is transmitted as an electrical signal to the controller 35.

A relief valve 11a is provided between the flow conduit 6a and the return oil conduit 10 to the oil reservoir 7, and a relief valve 11b is provided between the flow conduit 6b and the return oil conduit 10 to the oil reservoir 7. Check valves 12a and 12b, for preventing cavitation, are provided in parallel to relief valves 11a and 11b, respectively.

In addition, the pilot flow conduits 14a and 14b are connected to the pilot ports 13a and 13b of the relief valves 11a and 11b, respectively, and further through solenoid proportional valves 15a and 15b, respectively, to the oil reservoir 7. A set pressure of the solenoid proportional valves 15a and 15b is controlled according to a current value in the controller 35, and the characteristics of the current value and the set pressure are presented in an inverse proportion, as shown in FIG. 2. Owing to these characteristics, the set pressure can be maintained at a high level, even upon electrical failure, to ensure safety of operation.

Those functions of the circuit in clockwise turning with the construction as described above are described with reference to FIG. 3.

(1) A stationary condition is a cancelled condition wherein the operation lever 32 is set at the neutral position N, a pilot pressure is not introduced into either the pilot flow conduit 33a or the pilot flow conduit 33b, the pressure switches 34a and 34b are set at OFF, and the left-side relief valve 11a and the right-side relief valve 11b are not controlled by the controller 35.

(2) In starting a clockwise turning operation, the operation lever 32 is operated in the R direction, pilot pressure is guided into the pilot oil conduit 33a and then into the pilot port 4a of the directional control valve 4, so that the directional control valve 4 is changed over to the position L. In this case, the pressure switch 34a, provided at the extreme end of the branch circuit of the pilot oil passage 33a, is turned to ON and generates an electrical signal to the controller 35. The controller 35 operates the left relief valve 11a according to the electrical signal. The controller 35 receives an electric signal from the potentiometer 22 representing the tilting angle θ of the boom 20, and if the value of the electrical signal is smaller than the specified value (hereafter referred to as "the reach is large"), an electrical signal is generated to the solenoid proportional valve 15a to control the pilot pressure of the pilot port 13a of the left-side relief valve 11a, so that the set pressure of the left-side relief valve 11a is set to 270 kg/cm². Even though the set pressure of the left-side relief valve 11a is 270 kg/cm², the reach is large and therefore the shock is small. Since the set pressure is as high as 270 kg/cm², the starting will not be delayed even though the reach is large.

If the value of the electrical signal of the tilting angle θ is larger than the specified value (hereafter referred to as "the reach is small"), the controller generates an electrical signal to the solenoid proportional valve 15a to control the pilot pressure of the pilot port 13a of the left-side relief valve 11a so that the set pressure is initially 100 kg/cm² and gradually reaches 270 kg/cm².

When the directional control valve 4 is changed over to the position L, the discharging oil of the hydraulic pump 1 flows through the directional control valve 4 into the oil flow conduit 6a, and, if the reach is small, the set pressure of the left-side relief valve 11a rises to 100 kg/cm², and the oil enters into the hydraulic motor 5. The set pressure of the left-side relief valve is as low as 100 kg/cm² even though the reach is small, and therefore the shock upon starting is small. After starting, the set pressure of the left-side relief valve gradually rises to reach 100 kg/cm², and the hydraulic motor 5 is accelerated.

(3) In regular turning operation, although the pressure switch is set to ON, a specified time passes. In this case, the controller 35 cancels the control of the left-side relief valve 11a (acceleration side) and sets the set pressure at 270 kg/cm² to control the right-side relief valve 11b (deceleration side). In other words, when the reach is minimum, the controller 35 generates an electrical signal to the solenoid proportional valve 15b, controls the pilot pressure of the pilot port of the right-side relief valve 11b to set the set pressure of the right-side relief valve 11b to 50 kg/cm² so that the set pressure becomes higher in proportion to the value of the reach and reaches 270 kg/cm² when the reach is maximum. Since the set pressure of the left-side relief valve 11a is 270 kg/cm², mud can be removed from the sides of the bucket by utilizing the turning force.

(4) For stopping the working machine, the operation lever 32 is operated in a direction opposite to the R direction. The pilot pressure is not guided to the pilot flow passage 33a, and the pressure switch 34a is turned to OFF. However, the controller 35 maintains the operation for two seconds and therefore the working machine is returned to the stationary condition described in (1) by the same control as in regular operation described in (3). The pilot pressure is not guided into the pilot port 4a of the directional control valve 4, the directional control valve 4 is reset to the neutral position N, the discharging oil of the hydraulic pump 1 is returned to the oil reservoir 7 through the return oil passage 8, and the flow of hydraulic oil into the hydraulic motor 5 is stopped. However, the hydraulic motor 5 rotates for an extremely short period of time, sucking oil from the oil reservoir 7 through the flow passage 6a, the check valve 12a, and the return oil passage 10, and the oil is returned to the oil reservoir 7 through the return oil passage 10 when the hydraulic pressure reaches the set pressure of the right-side relief valve 11b. The set pressure of the right-side relief valve 11b is low when the reach is small, and therefore the shock upon stopping is also small. Since the set pressure is high when the reach is large, a stopping operation will not be delayed.

In this example, when the controller 35 is able to control only one of the two relief valves 11a and 11b, the set pressure of the right-side relief valve 11b is controlled to stop the working machine.

An example of stopping operation when the set pressures of both relief valves 11a and 11b can be simultaneously controlled is described below.

(5) For stopping the working machine, the controller 5 controls both the left-side relief valve 11a (acceleration side) and the right-side relief valve 11b (deceleration side). The set pressure for both relief valves 11a and 11b is set at 50 kg/cm² when the reach is minimum and at 270 kg/cm² when the reach is maximum. If the set pressure of the left-side relief valve 11a is changed in proportion to the value of reach, the so-called "swing back", that causes the working machine to turn counterclockwise when its clockwise turning is suddenly stopped and causes the working machine to turn clockwise when its counterclockwise turning is suddenly stopped, can be prevented.

The above description is made with an emphasis on clockwise turning. In the case of counterclockwise turning, the operations are only reversed, and therefore the description of counterclockwise turning is omitted.

Figure 4:
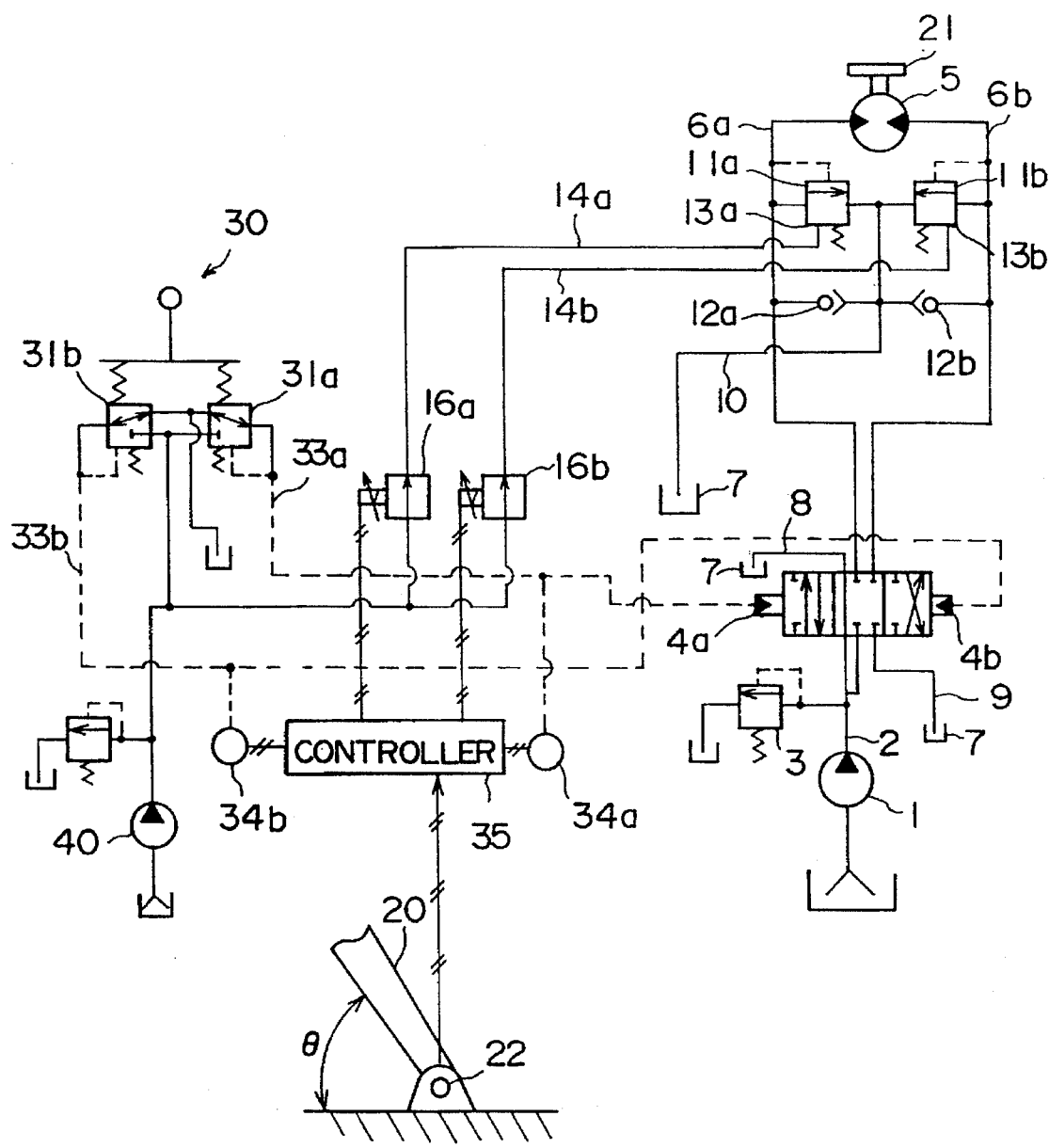
FIG. 4 is a diagram of a swing hydraulic circuit for a hydraulic shovel according to a second embodiment.
Figure 5:
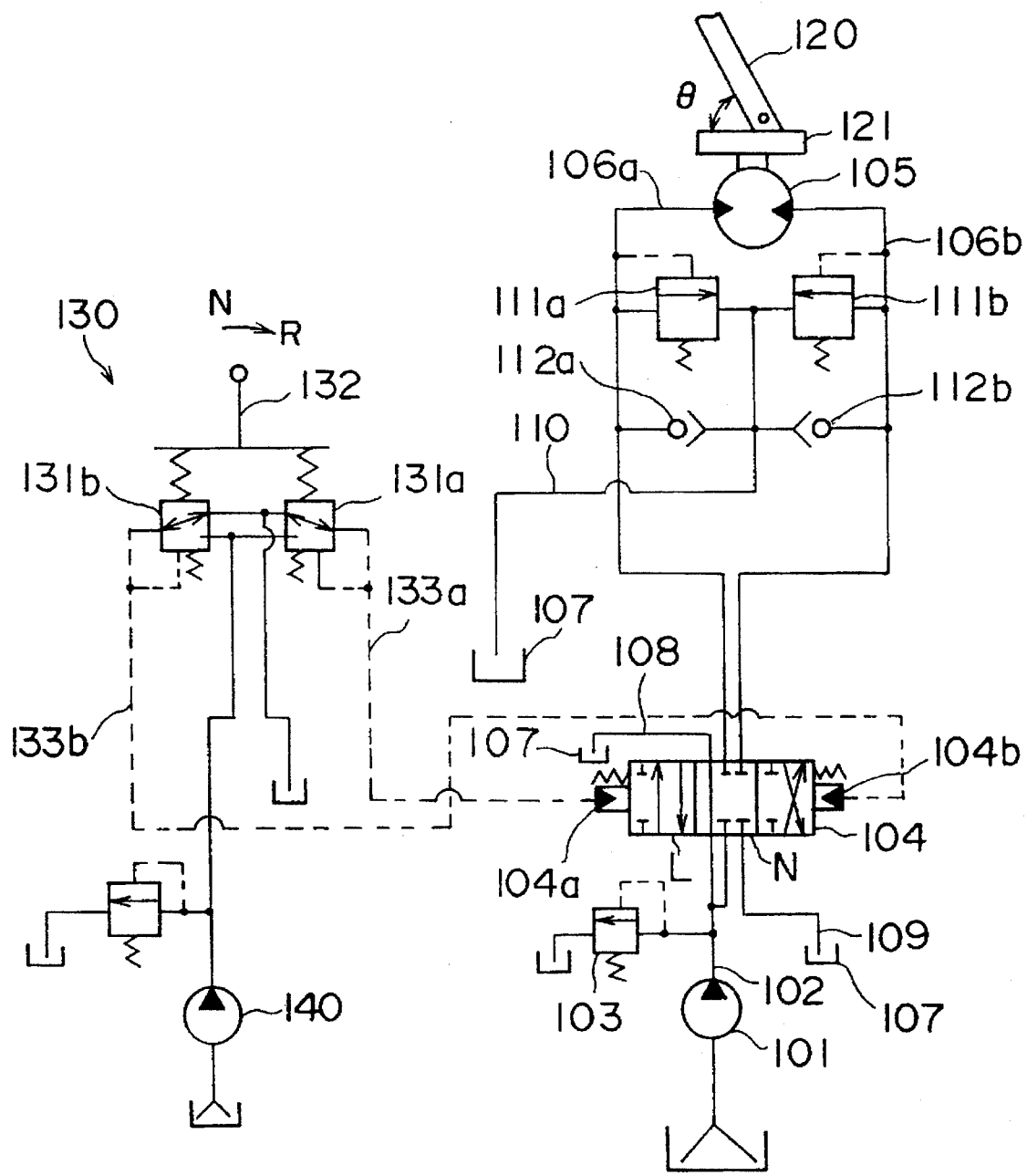
FIG. 5 is a diagram of a conventional swing hydraulic circuit for a hydraulic shovel.
Figure 6A:
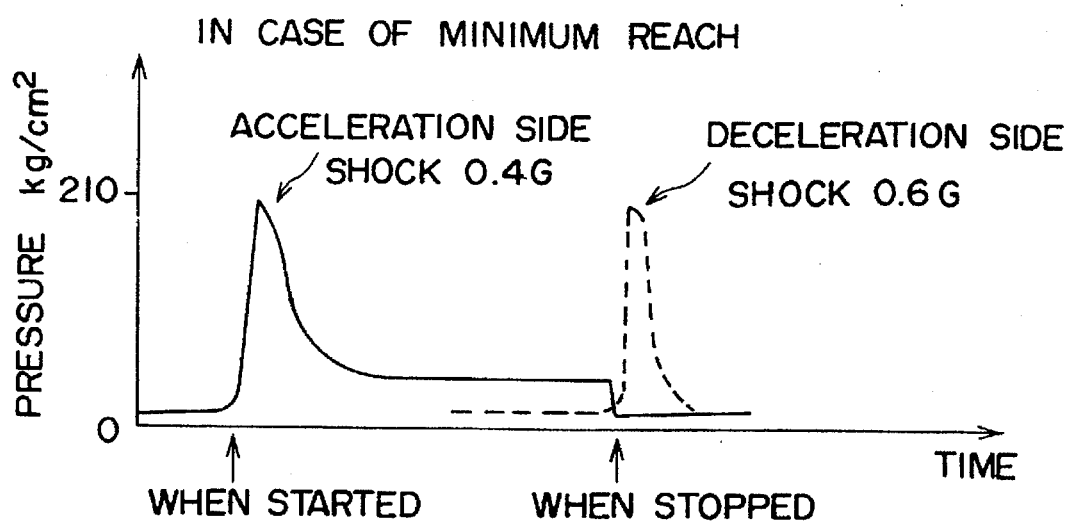
FIG. 6A is a diagram showing a shock caused at the time of starting and stopping the turning frame when the reach of the working machine is at the minimum.
Figure 6B:
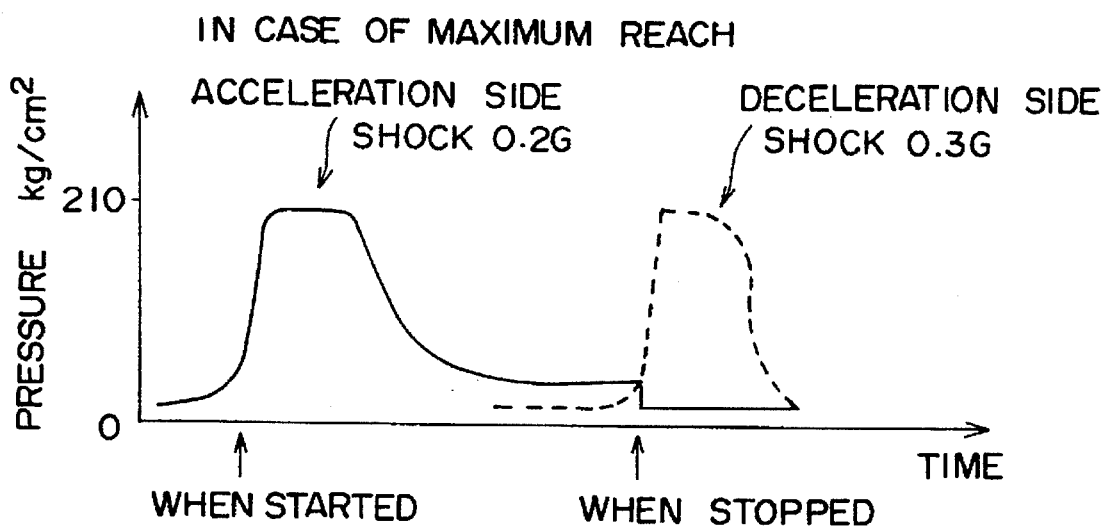
FIG. 6B is a diagram showing a shock caused at the time of starting and stopping the turning frame when the reach of the working machine is at the maximum.

A second embodiment is described below, referring to FIG. 4. In the second embodiment, components are given the same reference numerals as in the first embodiment, and therefore the description thereof is omitted, except that the setting means for the set pressure of both relief valves 11a and 11b differs from that in the first embodiment.

The flow conduits 14a and 14b are connected to the pilot ports 13a and 13b of the two relief valves 11a and 11b, respectively, and are further connected through the solenoid proportional valves 16a and 16b, respectively, to a pilot hydraulic pump 40. The pilot pressure of the solenoid proportional valves 16a and 16b varies with the current value of the controller 35 and is maximum when this current value is zero. The pilot pressure becomes smaller as the current value increases. Accordingly, the current value of the controller 35 and the set pressure of both relief valves 11a and 11b are in an inverse proportional relationship, as shown in FIG. 2. Even when the controller 35 fails and cannot generate electrical signals, the set pressure of both relief valves 11a and 11b is the maximum. Although a shock is caused upon the starting and stopping of turning when the reach is small, a stopping operation will not be delayed when the reach is large. In addition, when the construction machine is parked on a slope, the set pressure remains maximum and the working machine will not fall down, thus ensuring the safety.

INDUSTRIAL APPLICABILITY

The present invention is useful as the swing hydraulic circuit for a construction machine which is free from a shock upon starting and stopping of the turning frame, even though the reach of the working machine is small, and a delay upon starting and stopping of the turning frame, even though the reach of the working machine is large.

What is claimed is:

1. In a swing hydraulic circuit suitable for use in a construction machine having a turning frame and a working machine mounted on said turning frame, said circuit comprising:

a hydraulic motor for turning said turning frame;

a directional control valve having first and second pilot ports at opposite ends thereof;

a hydraulic pump having an output connected to said directional control valve;

first and second side flow conduits connected between said directional control valve and said hydraulic motor, whereby said directional control valve can selectively provide pressurized hydraulic fluid from said hydraulic pump to said hydraulic motor via said first and second side flow conduits;

a remote control turning valve having first and second pilot pressure outlet ports;

a lever for operating said remote control turning valve;

a first pilot flow conduit connected between said first pilot pressure outlet port and said first pilot pressure port of said directional control valve;

a second pilot flow conduit connected between said second pilot pressure outlet port and said second pilot pressure port of said directional control valve;

a first relief valve connected between said first side flow conduit and a return conduit, said first relief valve having a set pressure input; and a second relief valve connected between said second side flow conduit and a return conduit, said second relief valve having a set pressure input;

the improvement comprising:

set pressure control means for controlling the set pressure input of each of said first and second relief valves in accordance with an attitude of said working machine when said lever is not in its neutral position.

2. A circuit in accordance with claim 1, wherein said set pressure control means comprises a sensor for indicating the attitude of said working machine.

3. A circuit in accordance with claim 2, wherein said working machine comprises a boom having a tilting angle, and wherein said sensor indicates the attitude of said working machine by determining said tilting angle.

4. A circuit in accordance with claim 3, wherein said set pressure control means further comprises:
- a first pressure switch connected to said first pilot flow conduit,
- a second pressure switch connected to said second pilot flow conduit,
- a controller which receives signals from said first and second pressure switches and said sensor,
- a first solenoid proportional valve for controlling the set pressure input of said first relief valve according to a command from said controller, and
- a second solenoid proportional valve for controlling the set pressure input of said second relief valve according to a command from said controller.

5. In a swing hydraulic circuit suitable for use in a construction machine having a turning frame and a working machine mounted on said turning frame, wherein said working machine comprises a boom having a tilting angle, said circuit comprising:
- a hydraulic motor for turning said turning frame;
- a directional control valve having first and second pilot ports at opposite ends thereof;
- a hydraulic pump having an output connected to said directional control valve;
- first and second side flow conduits connected between said directional control valve and said hydraulic motor, whereby said directional control valve can selectively provide pressurized hydraulic fluid from said hydraulic pump to said hydraulic motor via said first and second side flow conduits;
- a remote control turning valve having first and second pilot pressure outlet ports;
- a lever for operating said remote control turning valve;
- a first pilot flow conduit connected between said first pilot pressure outlet port and said first pilot pressure port of said directional control valve;
- a second pilot flow conduit connected between said second pilot pressure outlet port and said second pilot pressure port of said directional control valve;
- a first relief valve connected to said first side flow conduit, said first relief valve having a set pressure input; and
- a second relief valve connected to said second side flow conduit, said second relief valve having a set pressure input;

the improvement comprising:
- set pressure control means for controlling the set pressure input of each of said first and second relief valves in accordance with an attitude of said working machine when said lever is not in its neutral position, wherein said set pressure control means comprises a sensor for indicating the attitude of said working machine, and wherein said sensor indicates the attitude of said working machine by determining said tilting angle;

wherein when said lever indicates a turning operation in a first direction, said directional control valve is actuated to selectively provide pressurized hydraulic fluid from said hydraulic pump to said hydraulic motor via said first side flow conduit, and said set pressure control means sets the set pressure input of said first relief valve, wherein when the thus determined tilting angle is smaller than a specified value said set pressure control means sets the set pressure input of said first relief valve at a predetermined high value, and wherein when the thus determined tilting angle is larger than a specified value said set pressure control means sets the set pressure input of said first relief valve initially at an intermediate value and then, after said turning frame starts turning, gradually increases the set pressure input of said first relief valve to a predetermined high value.

6. A circuit in accordance with claim 5, wherein after the passage of a specified time period following the actuation of said lever to indicate a turning operation in said first direction, said set pressure control means cancels the control of the set pressure input of said first relief valve and in order to control deceleration of said turning frame sets the set pressure input of said second relief valve as an inverse function of said thus determined tilting angle, wherein the set pressure input of said second relief valve is set at a low value when said thus determined tilting angle is high and is set at a high value when said thus determined tilting angle is low.

7. A circuit in accordance with claim 6, wherein upon the actuation of said lever to indicate a stopping of a turning operation in said first direction, said set pressure control means continues the control of the set pressure input of said second relief valve for a specified time period, during which the set pressure input of said second relief valve is set at a low value when said thus determined tilting angle is high and is set at a high value when said thus determined tilting angle is low, and upon the expiration of said specified time period after the actuation of said lever to indicate a stopping of a turning operation, said set pressure control means cancels the control of the set pressure input of said second relief valve.

8. A circuit in accordance with claim 6, wherein upon the actuation of said lever to indicate a stopping of a turning operation in said first direction, said set pressure control means controls the set pressure input of each of said first and second relief valves for a specified time period, during which the set pressure input of each of said first and second relief valves is set at a low value when said thus determined tilting angle is high and is set at a high value when said thus determined tilting angle is low, and upon the expiration of said specified time period after the actuation of said lever to indicate a stopping of a turning operation, said controller cancels the control of the set pressure input of each of said first and second relief valves.

9. In a swing hydraulic circuit suitable for use in a construction machine having a turning frame and a working machine mounted on said turning frame, said circuit comprising:
- a hydraulic motor for turning said turning frame;
- a directional control valve having first and second pilot ports at opposite ends thereof;
- a hydraulic pump having an output connected to said directional control valve;
- first and second side flow conduits connected between said directional control valve and said hydraulic motor, whereby said directional control valve can selectively provide pressurized hydraulic fluid from said hydraulic pump to said hydraulic motor via said first and second side flow conduits;
- a remote control turning valve having first and second pilot pressure outlet ports;

a lever for operating said remote control turning valve;

a first pilot flow conduit connected between said first pilot pressure outlet port and said first pilot pressure port of said directional control valve;

a second pilot flow conduit connected between said second pilot pressure outlet port and said second pilot pressure port of said directional control valve;

a first relief valve connected to said first side flow conduit, said first relief valve having a set pressure input; and a second relief valve connected to said second side flow conduit, said second relief valve having a set pressure input;

the improvement comprising:

set pressure control means for controlling the set pressure input of each of said first and second relief valves in accordance with an attitude of said working machine when said lever is not in its neutral position, wherein said set pressure control means comprises:

a first pressure switch connected to said first pilot flow conduit, a second pressure switch connected to said second pilot flow conduit, a sensor for indicating the attitude of said working machine, a controller which receives signals from said first and second pressure switches and said sensor, a first solenoid proportional valve for controlling the set pressure input of said first relief valve according to a command from said controller, and a second solenoid proportional valve for controlling the set pressure input of said second relief valve according to a command from said controller.

10. A circuit in accordance with claim 9, wherein one side of each solenoid proportional valve is connected through a pilot flow conduit to the set pressure input of a respective relief valve, and the other side of each solenoid proportional valve is connected to an oil reservoir.

11. A circuit in accordance with claim 9, wherein one side of each solenoid proportional valve is connected through a pilot flow conduit to the set pressure input of a respective relief valve, and the other side of each solenoid proportional valve is connected to a pilot hydraulic pump.

12. A circuit in accordance with claim 9, wherein said working machine comprises a boom having a tilting angle, and wherein said sensor indicates the attitude of said working machine by determining said tilting angle.

13. A circuit in accordance with claim 12, wherein when said lever indicates a turning operation in a first direction, said directional control valve is actuated to selectively provide pressurized hydraulic fluid from said hydraulic pump to said hydraulic motor via said first side flow conduit, said first pressure switch is turned ON to send a signal to said controller, and said controller sets the set pressure input of said first relief valve in accordance with the signal from said first pressure switch, wherein when the thus determined tilting angle is smaller than a specified value said controller sets the set pressure input of said first relief valve at a predetermined high value, and wherein when the thus determined tilting angle is larger than a specified value said controller sets the set pressure input of said first relief valve initially at an intermediate value and then, after said turning frame starts turning, gradually increases the set pressure input of said first relief valve to a predetermined high value.

14. A circuit in accordance with claim 13, wherein after the passage of a specified time period following the actuation of said lever to indicate a turning operation in said first direction, said controller cancels the control of the set pressure input of said first relief valve and in order to control deceleration of said turning frame sets the set pressure input of said second relief valve as an inverse function of said thus determined tilting angle, wherein the set pressure input of said second relief valve is set at a low value when said thus determined tilting angle is high and is set at a high value when said thus determined tilting angle is low.

15. A circuit in accordance with claim 14, wherein upon the actuation of said lever to indicate a stopping of a turning operation in said first direction, said controller continues the control of the set pressure input of said second relief valve for a specified time period, during which the set pressure input of said second relief valve is set at a low value when said thus determined tilting angle is high and is set at a high value when said thus determined tilting angle is low, and upon the expiration of said specified time period after the actuation of said lever to indicate a stopping of a turning operation, said controller cancels the control of the set pressure input of said second relief valve.

16. A circuit in accordance with claim 15, wherein one side of each solenoid proportional valve is connected through a pilot flow conduit to the set pressure input of a respective relief valve, and the other side of each solenoid proportional valve is connected to an oil reservoir.

17. A circuit in accordance with claim 15, wherein one side of each solenoid proportional valve is connected through a pilot flow conduit to the set pressure input of a respective relief valve, and the other side of each solenoid proportional valve is connected to a pilot hydraulic pump.

18. A circuit in accordance with claim 14, wherein upon the actuation of said lever to indicate a stopping of a turning operation in said first direction, said controller controls the set pressure input of each of said first and second relief valves for a specified time period, during which the set pressure input of each of said first and second relief valves is set at a low value when said thus determined tilting angle is high and is set at a high value when said thus determined tilting angle is low, and upon the expiration of said specified time period after the actuation of said lever to indicate a stopping of a turning operation, said controller cancels the control of the set pressure input of each of said first and second relief valves.

19. A circuit in accordance with claim 18, wherein one side of each solenoid proportional valve is connected through a pilot flow conduit to the set pressure input of a respective relief valve, and the other side of each solenoid proportional valve is connected to an oil reservoir.

20. A circuit in accordance with claim 18, wherein one side of each solenoid proportional valve is connected through a pilot flow conduit to the set pressure input of a respective relief valve, and the other side of each solenoid proportional valve is connected to a pilot hydraulic pump.

* * * * *